United States Patent [19]

Jurisich

[11] 4,139,591

[45] Feb. 13, 1979

[54] REINFORCED PLASTIC MOLDING MATERIAL

[76] Inventor: Peter L. Jurisich, 26232 Tierra Cir., Mission Viejo, Calif. 92675

[21] Appl. No.: 541,877

[22] Filed: Jan. 17, 1975

Related U.S. Application Data

[63] Continuation of Ser. No. 333,117, Feb. 16, 1973, abandoned.

[51] Int. Cl.$^2$ .............................................. B29N 9/02
[52] U.S. Cl. .................................. 264/257; 156/178; 156/212; 156/231; 156/235; 156/238; 156/239; 156/246; 264/12; 264/80; 264/258; 428/245; 428/251; 428/268
[58] Field of Search .............. 428/913, 914, 245, 268, 428/228, 251, 301, 303, 323; 156/246, 285, 286, 287, 289, 251, 268, 276, 178, 212, 231, 235, 238, 239; 264/90, 134, 135, 257, 258

[56] References Cited

U.S. PATENT DOCUMENTS

| | | | |
|---|---|---|---|
| 2,649,396 | 8/1953 | Witt et al. | 428/251 |
| 2,650,184 | 8/1953 | Biefield | 428/268 |
| 3,622,416 | 11/1971 | Brandt | 156/178 |
| 3,928,210 | 12/1975 | Peterson | 428/290 |

*Primary Examiner*—James J. Bell
*Attorney, Agent, or Firm*—George F. Bethel; Patience K. Bethel

[57] ABSTRACT

A laminating material such as a fibrous glass formed as a woven fabric or chopped strand mat which has been coated with a plastic resin on both sides thereof. The plastic resin is applied so that it does not permeate the fibers of the reinforcing material but is only adhered on the surfaces thereof. The resin coating is maintained intact on the reinforcing material by incorporation of a fine light mat, referred to as a carrier, in the resin coating.

The reinforcing material can be made by initially laying down a resin coating on release film, together with the carrier. After processing of the resin to its final tackiness required for laminating, the resin sheet is adhered to one or preferably both surfaces of the laminating fabric.

6 Claims, 5 Drawing Figures

U.S. Patent  Feb. 13, 1979  4,139,591
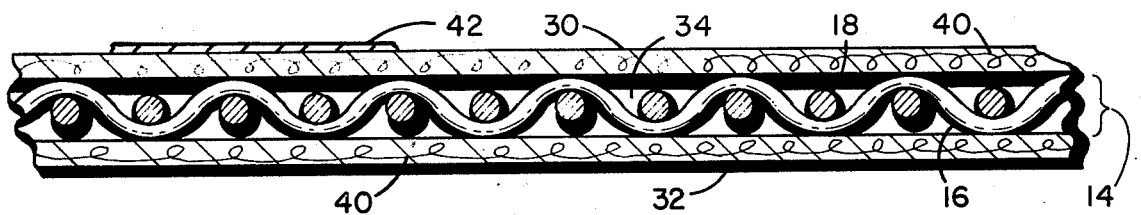
FIG. 2
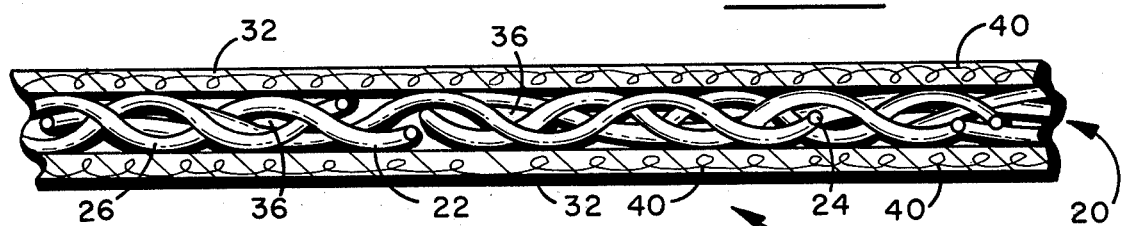
FIG. 3
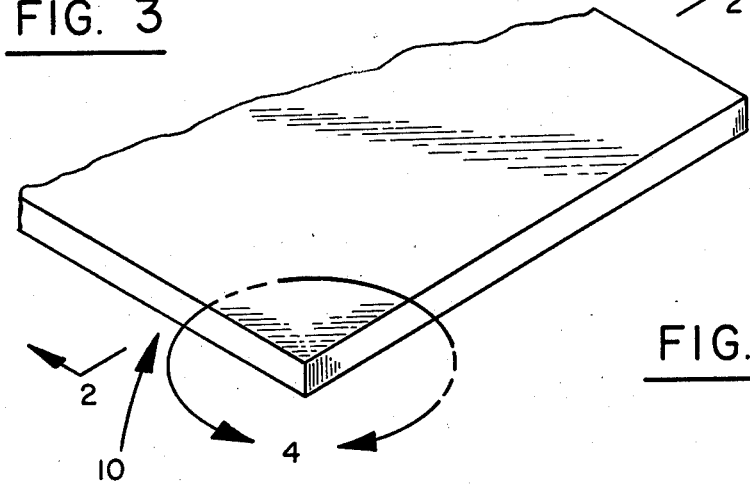
FIG. 1
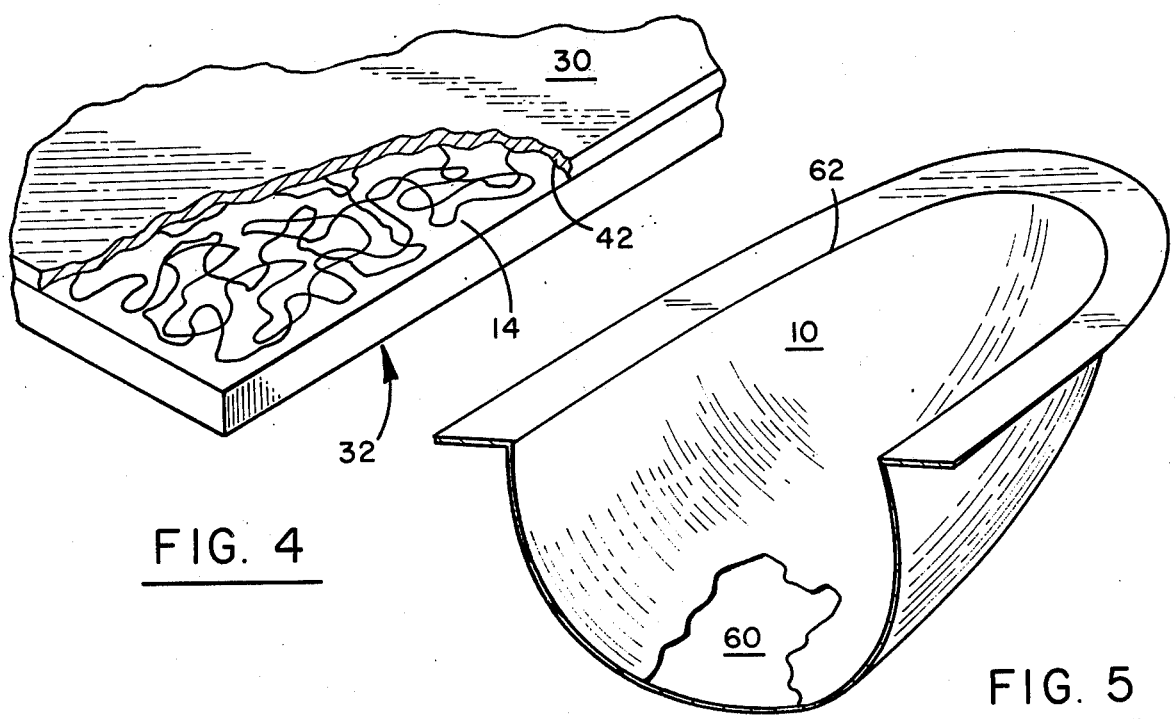
FIG. 4
FIG. 5

REINFORCED PLASTIC MOLDING MATERIAL

This is a Continuation of my previously filed application which bears a Ser. No. 333,117 and a filing date of Feb. 16, 1973 now abandoned.

BACKGROUND OF THE INVENTION

1. Field of the Invention

The field of this invention lies within the plastic reinforcing art.

2. The Prior Art

The prior art relating to plastic reinforcing materials involves the use of pre-impregnated or coated fabrics or mats of which all or a portion of the individual fibers have been surrounded by the resin. When used for making contoured laminates, such materials offer resistance to bending and stretching to the desired shape of the end product. This is due in part to the resin viscosity between the adjacent fibers restricting relative movement between fibers.

When the resin has low viscosity, the laminating fabric can be formed readily but will not stay in place, thereby pulling loose when other portions of the fabric are handled or by its own weight when placed on vertical surfaces.

When the resin has the proper degree of hard tack to prevent this displacement after being secured in place, the fabric is very difficult to bend and stretch into position. In other words, it tends to have a memory, thus pulling away from sharp contoured areas.

This invention overcomes the foregoing deficiencies of the prior art by creating a combination of fabric or mat and resin that will not spring back after being bent over sharp corners or formed over severe compound contours. The combination consists of a laminating fabric having a discrete uncured resin on both surfaces. The resin is applied in such a manner that it is substantially adhered to only the surface of the fabric or mat by means of the inherent, desired, hard tackiness needed for many types of laminating.

During the bending, the composite acts as a sandwich material having ductile facings of zero yield strength, thereby sandwiching a very pliant core. Such a system has limited spring-back after bending because the tension face or surface has stretched and the compression face has compressed to new lengths.

Some of the resins used require cold storage to prevent deterioration. Even though they are pliable and tacky at room temperature, they are very brittle when cold. In the configuration of this invention they tend to flake away very readily from the surface of the fabric or mat. To prevent this, a very lightweight mat carrier can be incorporated in the resin coatings in the form of a web of strands.

Typical laminating resins are made into sheet form by hot melt coating release film or solvent casting on release films and subsequent drying of the cast sheet. To obtain the desired combination of this invention, the hot melt formed resin sheet is cooled to room temperature and the solution casting is dried to remove all solvent prior to being adhered to the surfaces of the laminating fabric. This assures minimum penetration through the surface fibers to those lying thereunder.

The foregoing product and process enables one to use a fabric that can be configured to compound curves and sharp bends so that the combination fabric and resin will maintain its situ prior to its final molding under heat and pressure. Using the combination of this invention, laminates have been made more easily than with conventionally coated fabrics of one third the weight and thickness with the weave pattern and fabric fiber material being the same. Thus, the labor cost is reduced to one third of what it was. Material cost is also substantially reduced.

Another advantage of this invention is that it is possible to obtain substantially void free laminates after a vacuum molding heat cure cycle. This is due to the fact that the resin is heated to flow through the fabric after a vacuum has been applied to the fabric. Also, conventionally coated fabrics are saturated with resin at ambient pressure in the fabric interstices, causing an entrapment problem.

SUMMARY OF THE INVENTION

In summation, this invention comprises a product and process for the manufacture thereof. The product comprises a resin and reinforcing material which can be formed in various configurations to effectuate initial proper placement of the resin and reinforcing material. More specifically, the invention comprises a reinforcing fabric or mat having a resin on either surface thereof. The resin on either surface is not completely cured, and is provided with a reinforcing web at its surface in order to prevent the resin from flaking and falling off the surface prior to the final molding process. The resin can be applied in any suitable manner, however, it should be maintained substantially on the outer surfaces of the reinforcing fabric and should not substantially penetrate any of the strands and interstices of the reinforcing material. In other words, the resin should be only on the surface thereof. As the resin begins to penetrate the interstices, the efficiency of the product is decreased.

The process of making the product can comprise the placing of resin on the surface of a reinforcing fabric, or mat. The resin is initially placed on a release film having a fine reinforcing web or series of strands thereon. The resin is then calendered or rolled into the reinforcing fabric creating a laminate of resin on both sides of the reinforcing mat. The release film remains on the exterior surfaces of the resin coatings to facilitate handling and storage.

The foregoing invention provides a product by the above process which can be placed on a mold or any other configuration so that once it is draped it has a tendency to remain substantially in place without springing back therefrom. The molding process can be with a matched metal mold, vacuum bag technique or any other suitable molding means. The resin should not permeate the interstices and interior of the reinforcing mat.

BRIEF DESCRIPTION OF THE DRAWINGS

The invention will be more clearly understood by reference to the description below taken in conjunction with the accompanying drawings wherein:

FIG. 1 shows a perspective view of the product of this invention which is in the form of a sheet material;

FIG. 2 shows a fragmented cross sectional view of the product of this invention in the direction of lines 2—2 of FIG. 1;

FIG. 3 shows an alternative embodiment of the product of this invention utilizing a different form of reinforcing mat taken in the same direction as FIG. 2;

FIG. 4 shows a partially stripped away fragmented perspective view of the product of this invention taken through the area encircled by line 4 of FIG. 1;

FIG. 5 shows a perspective view of the product of this invention being placed on a mold surface prior to the finalization of the product into which it is to be made.

DESCRIPTION OF THE PREFERRED EMBODIMENTS

Looking at the figures, it is seen that a sheet 10 of reinforcing product of this invention is shown in FIG. 1.

The product as shown in FIG. 2 comprises a woven material having such strands as warp strands 16 and fill strands 18. The warp and fill strands 16 and 18 respectively can form any textile type of material utilized as a reinforcing material for plastics. For instance, fibrous glass, jute, and other natural fibers, polymers, and asbestos cloth can be utilized for reinforcing purposes and woven into a textile fabric.

The textile reinforcing fabric or mat generally comprises a woven material formed from relatively thick strands that have been woven by a loom. However, other materials other than the woven cloth 14 can be utilized. Typically, a non-woven material 20 generally shown in FIG. 3 can be utilized in lieu of the woven material 14. The non-woven material 20 can comprise a multitude of fibers 22, 24 and 26 which are in a labyrinth of cross meshed configurations. Specifically, the non-woven material 20 can be a chopped strand mat or a continuous filament mat built up into an overlying series of continuous filaments. Often the foregoing unwoven mats are formed by means of a binder holding the entire configuration of unwoven mat together. In this manner, the integrity of the mat is maintained without the utilization of a woven effect. When fabrics 14 and mats 20 are referred to both here and in the claims, it should be understood that they are interchangeable for the practise of this invention. In other words, the resins and their relationship to the fabrics 14 or mats 20 is the key to the invention and not necessarily the character of the reinforcing material formed of fabric or mat.

The foregoing types of mats utilized in this invention have a resin coating 30 and 32 applied to the surfaces thereof. The resin coatings 30 and 32 are applied to both surfaces as shown. Whichever way they are applied, it should be noticed that the resin does not permeate the entire cross section of the fabric 14 or the non-woven mat 20.

In the foregoing manner, voids 34 are retained within the interstices of the fabric 14. Also, voids 36 are shown within the interstices of the non-woven mat 20. The interstices 34 or 36 are later filled in the molding process wherein the resin 30 and 32 flows into the voids. Suffice it to say in the particular application of this product before it is finalized into an end product, the placement of the resin 30 and 32 on the surface of the fabric or mat is highly desirable. The resin 30 and 32 is applied to the surface of the reinforcing fabric 14 and mat 20 by impressment, rolling, or through many of the suitable resin application processes known in the art.

The resin 30 and 32 is supported by a web 40 comprised of very fine strands or single filaments implaced within the surface of the resin. The web 40 can be a thin web of reinforcing material of any suitable type such as fibrous glass, natural fibers, or any other suitable synthetic. The purpose of the fine strands or web in the resin surface is to provide a system within the resin to prevent it from cracking on the surface of the textile fabric 14 or mat 20.

The entire product can be provided with a release film 42 on either surface thereof. The release film 42 can be incorporated as a portion of the initial process in the form of a substrate for resin. The release film 42 can be of any suitable material such as a release paper or plastic sheet having a surface for being compatibly removed from the resin it is used with, without deleterious effects on the resin. The release film 42 can be maintained in situ on the product during the initial layup process, or removed prior thereto.

In most cases the resin 30 and 32 will be a thermosetting resin. In other words, the resin 30 and 32 has been brought to the "B" stage of cure commonly described in the uncured stages of phenolic resins.

The resin can be preferably coated on both sides of the fabric 14 or mat 20. The resin can be a phenolic, melamine, polyester, epoxy, silicone combination or other type.

The final molding process utilizing the end product can be preferably a thermosetting technique. Such techniques as vacuum bag molding, matched metal die, hot press or pressure bag conformation can all be utilized with the product.

PROCESS OF MANUFACTURE

The process for manufacturing the product of this invention can initially start out with any suitable reinforcing mat or fabric. The fabric or mat 14 or 20 can be formed from fibrous glass, jute, synthetic material, or any other woven or non-woven composition. The main reinforcing mat should be compatible with the specific plastic or resin that it is to be used with. In other words, the size on the mat or strands thereof should be compatible with the plastic or resin. Furthermore, the mat or fabric 20 or 14, should have sufficient temperature and stress specifications to be utilized effectively with the end process in which it is placed.

The reinforcing mat 14 or 20 is exposed to the resin 30 or 32 so that it does not substantially penetrate the interstices of the mat or fabric. To the contrary, as is common in many processes for impregnated reinforcing mats, the resin completely permeates the interstices of each particular strand. This tends to make the strands stiff and non-flexible. Furthermore, it does not allow for the dispersion of the resin at a later date in the most advantageous manner. Also, it creates lean or rich sections with regard to the resin or the reinforcing material in the end product.

It should be emphasized that this invention is such that it should not allow the resin to permeate the interstices of the reinforcing fabric or mat. When the resin permeates the interstices it tends to decrease the drapeability of the end product and increase the spring return thereof when placed over a small surface.

The foregoing process can be accomplished by any suitable coating means compatible with the mat 20 or fabric 14. However, it has been found that by coating release film 42 with resin 30 or 32 the thin web of reinforcing material can then be applied to the resin 30 or 32. The release film 42 with the resin 30 or 32 and web 40 thereon can be impressed against the surface fibers of the fabric 14 or mat 20. The impressment thereof allows the resin to be adhered to the surface of the fabric 14 or mat 20.

The foregoing process can utilize the plastic or resin 30 or 32 in a hot melt form, or in any other suitable system. Also, the resins can be of any suitable type as long as they are effective in the end product. Some of the resins that can be utilized are phenolics, melamines, polyesters, epoxies, silicones, and other types that can be applied to the surface of the fabric 14 or mat 20.

PRODUCT APPLICATION

Looking more particularly at FIG. 5, a mold surface 60 is seen overlaid with the reinforcing product 10 of this invention. The reinforcing product 10 has been laid so that it conforms to the surface of the mold, as well as the corner 62. The draping of the material is such that it maintains the form that it is draped in over the corner 62 and surface 66, even though it is a compound configuration. Specifically, the fact that there are curves and other geometric elements within or on the mold surface 60, does not detract from the operation of the invention as in the prior art. The material 10 does not spring away from the mold surface 60 but maintains its position in situ thereagainst. This enhances the formation of the material 10 in its initial placement, so that it does not spring back.

The foregoing drapeability is accomplished by virtue of the fact that the material 10 has the resin 30 and 32 on its surface. This serves the purpose of providing a retention element when the fibers of the fabric 14 or mat 20 are moved. Furthermore, the elimination of resin throughout the fibers also helps to enable the fabric 14 or mat 20 to retain its position without springing back. It is thought that the placement of one layer in compression on a compound surface and the other layer in tension, serves to hold the laminating material in place.

It should be understood that the foregoing teachings of this invention incorporate various modifications of material. Specifically, the reinforcing material such as fabric 14 or mat 20 can be utilized in various woven and non-woven configurations utilizing various synthetic and natural materials. Furthermore, the resins as enunciated in the specification can be of various types. Thus, this invention is only to be read and understood in light of the following claims as to the scope and spirit thereof.

I claim:

1. The process of manufacturing a laminating material for use in the forming of a cured composite fibrous glass and resin product comprising:
   supplying a reinforcing fibrous glass mat or fabric;
   supplying a release paper;
   placing a plastic resin in a partially cured stage compatible with the fibrous glass on said release paper in a partially adhered manner wherein said resin can form a cured composite product with the reinforcing fibrous glass mat or fabric;
   applying a thin web or strands of material into the resin to help to maintain it from flaking off the mat or fabric during any bending or movement thereof prior to forming the product to be formed; and,
   impressing the combination of said release paper with said resin and thin web or strand of material therein against the surface of said fibrous glass fabric or mat whereby said release paper is exposed with said resin and reinforcing web thereunder so that said resin extends into the interstices of said fibrous glass fabric or mat sufficiently to cause it to bind to the reinforcing mat or fabric strands so that at least a portion of the fibers are secured together to allow the resin to flow in sufficient quantity substantially between all fibers to cause the resin to extend substantially into the interstices throughout the cross section of said fabric to form a product having resin content through its cross section.

2. The process as claimed in claim 1 further comprising:
   pressing the combination of said resin, web and release paper on both surfaces of said fabric or mat.

3. The process as claimed in claim 1 further comprising:
   utilization of a chopped strand mat.

4. The process as claimed in claim 1 further comprising:
   utilization of a woven fibrous glass mat.

5. The process of manufacturing a finished composite product of fibrous glass reinforced plastic comprising:
   supplying a reinforcing mat or fabric;
   supplying a release paper against said reinforcing mat or fabric;
   placing a plastic resin compatible with said fibrous glass that has not been brought to its final cure to form the plastic of the end product with the reinforcing fabric or mat against said release paper in a partially adhered manner;
   applying a thin web or strands of material to the resin to maintain the resin from flaking off the mat or fabric during movement or subsequent conformation in forming the fibrous glass reinforced plastic;
   impressing the combination of resin with the reinforcing web into the surface of said fabric or mat sufficiently into the interstices so that they are bound at least to a limited degree at the surface thereof;
   applying said combination against a form of the final end product to which the combination is to be conformed;
   removing said release paper from said combination;
   forming said combination with respect to said form so as to cause the resin to flow and extend substantially through the cross section of the mat or fabric; and,
   curing said resin to form the fibrous glass reinforced plastic product.

6. The process of claim 5 further comprising:
   Applying said combination to both surfaces of said fabric or mat.

* * * * *